June 29, 1943.    E. P. SADLER    2,323,283
COFFEE MAKER
Filed May 12, 1942
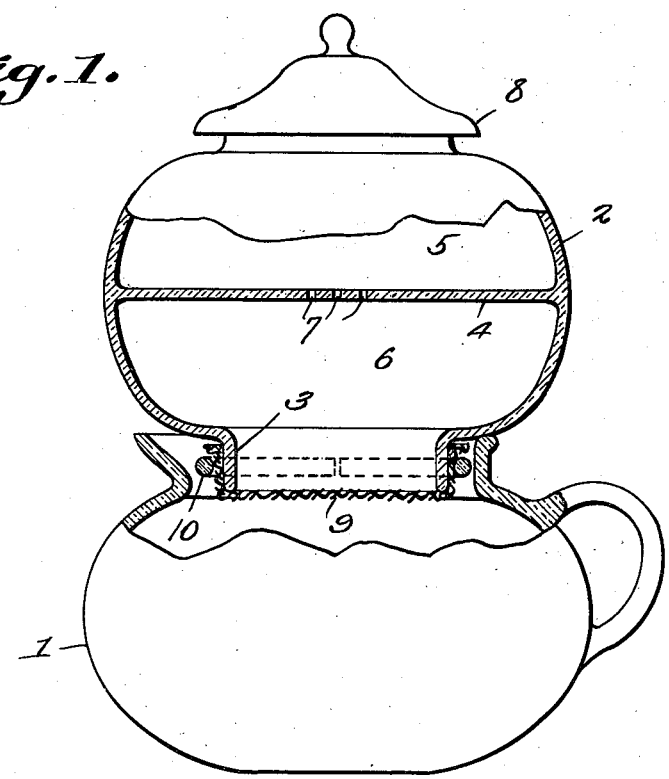
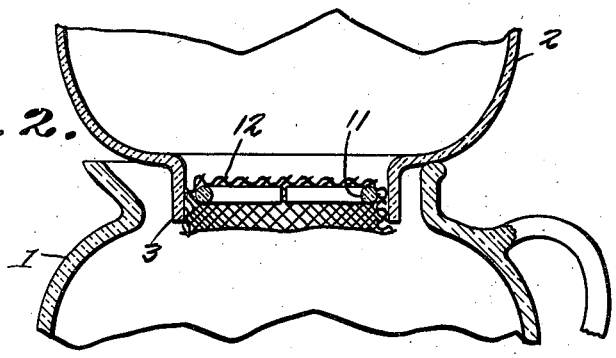
E. P. Sadler
INVENTOR.

Patented June 29, 1943

2,323,283

UNITED STATES PATENT OFFICE 2,323,283

COFFEE MAKER

Edward P. Sadler, Louisville, Ky., assignor of one-half to Clarence M. Wheeler, Louisville, Ky.

Application May 12, 1942, Serial No. 442,703

1 Claim. (Cl. 53—3)

This invention relates to coffee makers of the type wherein hot water is allowed to flow slowly through comminuted coffee supported thereunder.

It has not been possible, with coffee makers as now constructed, to filter the coffee as thoroughly as desired and, furthermore, it has been necessary to use metal in the construction.

An object of the invention is to eliminate all metal in the construction of the device, if so desired and to greatly reduce the amount of labor and material required in its construction.

A further object is to provide a coffee maker which is simple in construction, acts to thoroughly filter the liquid and can be easily assembled and also taken apart for cleaning and refilling.

In a coffee maker it is desirable to hold the comminuted coffee submerged at all times during the coffee-making operation. As coffee is lighter than water its tendency is to float on the surface of the water when it is mixed therewith. As a result the full strength of the coffee is not extracted. The present invention has for an object the provision of means whereby the comminuted coffee is held thoroughly submerged at all times during the drainage of water into the lower receptacle, thereby resulting in the production of a better grade of beverage than is generally possible with other means employed.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawing the preferred form of the invention has been shown.

In said drawing

Figure 1 is a view partly in elevation and partly in section of a coffee maker constructed in accordance with the present invention.

Figure 2 is a section through a portion of a modified construction.

Referring to the figures by characters of reference, 1 designates the lower section of the coffee maker which can be made of glass, earthenware, metal or any other desired material although it is preferred at the present time to eliminate the use of metal. Its design can be changed to meet the requirements and in the present instance it has been shown as a pitcher from which coffee can be poured.

There is combined with the lower member 1 an upper member or container 2 which likewise can be formed of glass, earthenware or metal. This container is formed with an integral depending sleeve 3 at its lower end and both its upper end and its lower end are open. The container is divided by an integral partition 4 into an upper or water compartment 5 and a lower or coffee compartment 6. One or more minute apertures 7 are formed in the partition. A lid 8 can be used for closing the upper end of container 2 and, when the container is not used, this lid 8 can be employed as a cover for the lower section 1.

A filtering fabric 9 of any suitable material is extended across the open bottom of the container 2 and is detachably held in position by any suitable means. For example a ring 10 of glass, plastic, metal, or other suitable material can be slipped onto the marginal portion of the filtering fabric so as to bind it against and around the depending sleeve 3. If preferred, however, a ring 11 can be used for pressing the fabric 12 into the neck and pressing it outwardly against the surface of the neck as shown in Fig. 2. Obviously the rings can be of any shapes desired as well as of any material desired.

In practice the container 2 is inverted so that the neck 3 will be uppermost. The required amount of comminuted coffee is placed in the compartment 6 after which the filtering fabric 9 or 12 is secured across the open end of neck 3 and held by either an external ring or an internal ring as heretofore explained. The container 2 is then positioned with its neck 3 lowermost and placed on the upper end of member 1 as shown. The required amount of boiling water thereafter is poured into compartment 5 and the lid 8 is placed in position. This water will gravitate in minute jets through the openings 7 and gradually seep downwardly through the coffee and through the filtering fabric 9. Consequently the hot water will carry off practically all of the value contained in the coffee and the resultant liquid will be thoroughly filtered before it is deposited in the lower member.

In the structure illustrated the sleeve has been shown cylindrical but it is to be understood that it could be tapered so that the ring thus would be wedged thereon. The ring can be in the form of a band or a wire and under some conditions it might be desirable to make the filter-retaining element in the form of a perforated disk having a peripheral band adapted to frictionally engage and grip the marginal portion of the fabric. All of these modifications are so obvious that it is not deemed necessary to illustrate or describe them in detail.

As the entire structure, other than the fabric, can be made of materials other than metal, it will be found especially advantageous if and when there is a scarcity of metal.

What is claimed is:

In a coffee-maker the combination with a lower member having an open top, an upper member formed in a single piece of material and proportional to rest on the lower member, there being an integral partition within the upper member dividing the interior of said member into an upper compartment and a lower compartment, there being apertures in the partition for maintaining communication between the compartments, said upper member having an upwardly extending inlet sleeve at its upper end and a downwardly extending outlet sleeve at its lower end, said outlet sleeve being proportioned to extend into the open top of the lower member, a fabric stretched across the outlet sleeve and constituting a filter, a ring of resilient material binding the marginal portion of the fabric to the outlet sleeve, and a lid removably mounted on the inlet sleeve, the two sleeves being of a diameter less than that of the opening in the top of the lower member and said lid being proportioned to close the open top of the lower member when the upper member is not in use.

EDWARD P. SADLER.